(12) United States Patent
Lazarz et al.

(10) Patent No.: US 11,707,977 B2
(45) Date of Patent: Jul. 25, 2023

(54) METHOD AND STRUCTURES TO ISOLATE DISSIMILAR METAL STRUCTURES

(71) Applicant: Ford Global Technologies, LLC, Dearborn, MI (US)

(72) Inventors: Kimberly Ann Lazarz, Ypsilanti, MI (US); Michael William Danyo, Trenton, MI (US); Sean Brady, Royal Oak, MI (US); Mike Popovski, Warren, MI (US); Anil Reddy Pullalarevu, Northville, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 17/358,995

(22) Filed: Jun. 25, 2021

(65) Prior Publication Data

US 2022/0410685 A1     Dec. 29, 2022

(51) Int. Cl.
*B60K 1/04*     (2019.01)
*B62D 24/00*     (2006.01)

(52) U.S. Cl.
CPC ............... *B60K 1/04* (2013.01); *B62D 24/00* (2013.01); *B60K 2001/0438* (2013.01)

(58) Field of Classification Search
CPC .......................... B62D 24/00; B60K 2001/0438
See application file for complete search history.

(56) References Cited

U.S. PATENT DOCUMENTS

| | | | | |
|---|---|---|---|---|
| 6,626,502 | B1* | 9/2003 | Petrak | B60B 3/16 301/9.1 |
| 7,704,009 | B2* | 4/2010 | Boote | F16D 1/033 301/35.627 |
| 8,092,923 | B2* | 1/2012 | Thamida | C22C 1/11 428/650 |
| 8,840,350 | B2* | 9/2014 | Inaba | F16B 5/02 411/546 |
| 9,689,418 | B2* | 6/2017 | Schumacher | F16B 31/02 |
| 9,840,289 | B2* | 12/2017 | Courtright | B62D 29/007 |
| 10,399,609 | B2* | 9/2019 | Hosking | B62D 27/00 |
| 2010/0142746 | A1* | 6/2010 | Heng | H04R 1/1016 381/384 |
| 2010/0143746 | A1* | 6/2010 | Song | C23C 24/04 427/328 |
| 2022/0410685 | A1* | 12/2022 | Lazarz | B60K 1/04 |

FOREIGN PATENT DOCUMENTS

CN     208180970     12/2018

\* cited by examiner

*Primary Examiner* — John D Walters
*Assistant Examiner* — James J Triggs
(74) *Attorney, Agent, or Firm* — Burris Law, PLLC

(57) ABSTRACT

A structural enclosure includes a pair of aluminum rails with an upper wall and a lower wall spaced apart from the upper wall, a plurality of sleeves extending into and captured within the aluminum rails, and each of the plurality of sleeves having a head with a predefined thickness disposed on an outer surface of the aluminum rails and configured to separate the outer surface of the aluminum rails from a steel vehicle chassis to which the aluminum rails are mounted. The structural enclosure can be an aluminum battery box for an electric vehicle and the aluminum battery box can be mounted to and electrochemically isolated from the steel vehicle chassis.

20 Claims, 5 Drawing Sheets

METHOD AND STRUCTURES TO ISOLATE DISSIMILAR METAL STRUCTURES

FIELD

The present disclosure relates to metal structures and particularly to metal structures manufactured from different materials.

BACKGROUND

The statements in this section merely provide background information related to the present disclosure and may not constitute prior art.

Vehicles are manufactured from a variety of materials such as steel, aluminum alloys, and plastics. In addition, the use of aluminum alloys has increased due to the reduced density of aluminum compared to iron and the desire to reduce vehicle weight and increase vehicle fuel efficiency. However, aluminum alloys are galvanically anodic relative to steel and thus galvanic corrosion can occur when an aluminum alloy component comes into contact with a steel component in the presence of an electrolyte.

The present disclosure addresses the issues of galvanic corrosion between aluminum alloys and steel, among other issues related to dissimilar metal corrosion.

SUMMARY

This section provides a general summary of the disclosure and is not a comprehensive disclosure of its full scope or all of its features.

In one form of the present disclosure, a structural enclosure includes at least one aluminum rail comprising an upper wall and a lower wall spaced apart from the upper wall, and at least one sleeve extending into and captured within the at least one aluminum rail. The at least one sleeve includes a head with a predefined thickness and the head is disposed on and separates an outer surface of the aluminum rail from a steel body structure to which the aluminum rail is mounted.

In some variations, the structural enclosure includes a plurality of sleeves extending into the aluminum rail and each of the plurality of sleeves have a head with the predefined thickness disposed on and separating the outer surface of the aluminum rail from the steel body structure to which the aluminum rail is mounted. In at least one variation each of the plurality of sleeves include a shaft extending from the head and the shafts are disposed in the at least one aluminum rail. And in some variations the shaft of each of the plurality of sleeves is a hollow shaft. In at least one variation a plurality of bolts is included and a respective bolt of the plurality of bolts extends at least partially through the hollow shaft of each of the plurality of sleeves. In such variations, the plurality of bolts are configured to mount the at least one aluminum rail to the steel body structure.

In some variations, the at least one aluminum rail is securely coupled to a battery box configured to enclose a plurality of battery modules for an electric vehicle. Also, in at least one variation the at least one aluminum rail is two aluminum rails securely coupled to the battery box.

In some variations, the at least one aluminum rail includes a pair of side walls extending between the upper wall and the lower wall and the at least one sleeve extends through the upper wall with the head disposed on the outer surface of the upper wall. In addition, in at least one variation the at least one aluminum rail further includes a cross member extending between the pair of side walls and the at least one sleeve has a shaft with an outer knurled surface extending through the upper wall and engaged with the cross member.

In some variations, the at least one aluminum rail and/or the at least one sleeve has a coating such that the at least one aluminum rail is electrochemically isolated from the at least one sleeve and/or the steel body structure such that galvanic corrosion between the at least one aluminum rail, the at least one sleeve and the steel body structure is inhibited.

In at least one variation the at least one aluminum rail and the at least one sleeve are E-coated such that the at least one aluminum rail is electrochemically isolated from the at least one sleeve and/or the steel body structure such that galvanic corrosion between the at least one aluminum rail, the at least one sleeve and the steel body structure is inhibited.

In some variations, a motor vehicle including the structural enclosure is provided.

In another form of the present disclosure a structural enclosure includes a battery box configured to enclose a plurality of battery modules for an electric vehicle, at least one aluminum rail securely mounted to the battery box and having an upper wall and a lower wall spaced apart from the upper wall, and a plurality of sleeves extending into and captured within the at least one aluminum rail. Each of the plurality of sleeves includes a head with a predefined thickness disposed on an outer surface of the aluminum rail and such that the outer surface of the at least one aluminum rail is separated from a steel body structure to which the at least one aluminum rail is mounted by the predefined thickness of the head.

In some variations, the at least one aluminum rail includes a pair of side walls extending between the upper wall and the lower wall, a cross member extending between the pair of side walls and spaced apart from the upper wall and the lower wall, and each of the plurality of sleeves extends through the upper wall and the cross member with the head disposed on the outer surface of the upper wall.

In at least one variation, the at least one aluminum rail is E-coated and each of the plurality of sleeves comprises a multi-layer coating such that the at least one aluminum rail is electrochemically isolated from the plurality of sleeves and/or the steel body structure.

In still another form of the present disclosure, a structural enclosure includes an aluminum battery box configured to enclose a plurality of battery modules for an electric vehicle, a pair of E-coated aluminum rails having an upper wall and a lower wall securely mounted to the aluminum battery box, and a plurality of E-coated sleeves extending into and captured within the pair of E-coated aluminum rails. Each of the plurality of E-coated sleeves include a head with a predefined thickness disposed on an outer surface of each of the pair of E-coated aluminum rails such that the outer surface of the pair of E-coated aluminum rails is spaced apart from an E-coated steel body structure to which the pair of E-coated aluminum rails are mounted.

In some variations, the structural enclosure includes a plurality of bolts extending at least partially through the plurality of E-coated sleeves and mounting the pair of E-coated aluminum rails to the E-coated steel body structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
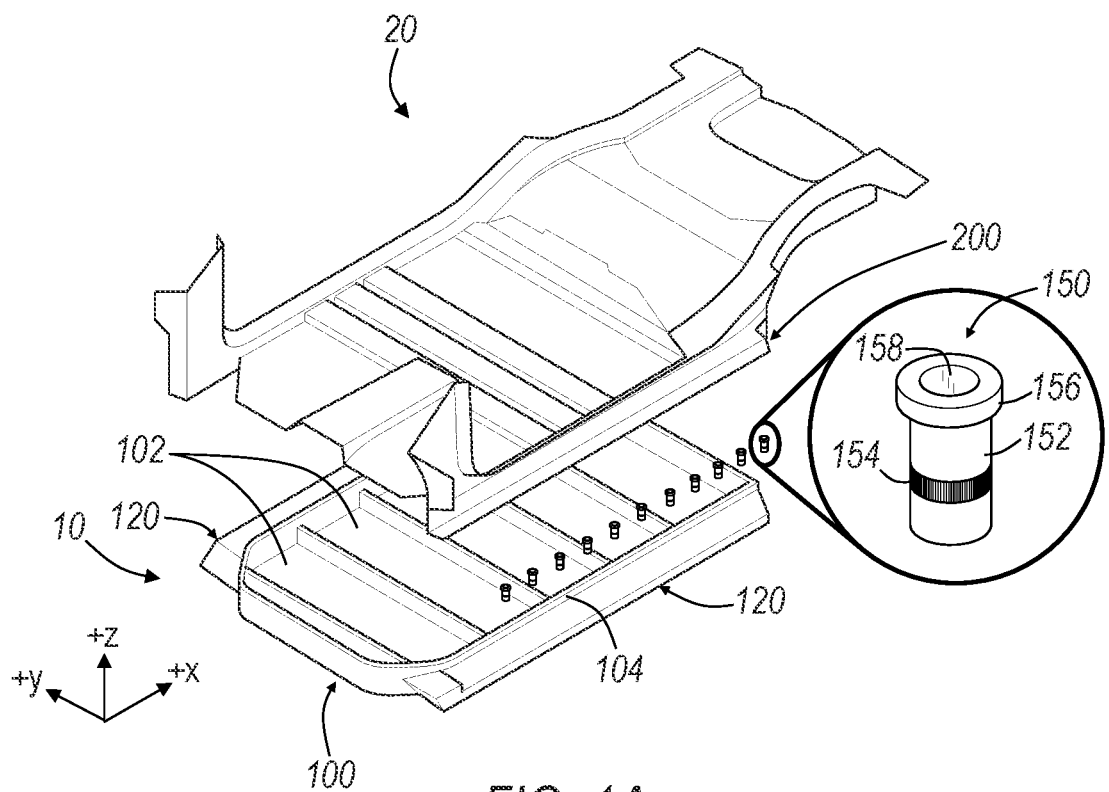
FIG. 1A shows an exploded perspective view of a structural enclosure and a vehicle chassis according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
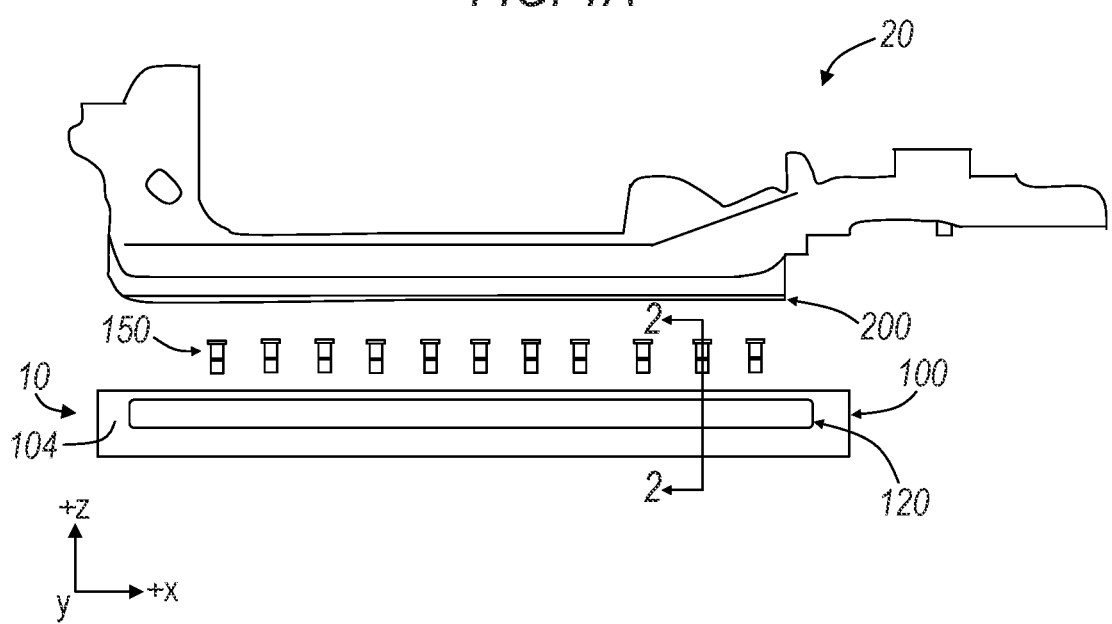
FIG. 1B shows a side view of FIG. 1A.

Referring to FIGS. 1A-1B, an exploded view of a structural enclosure 10 and a vehicle chassis 20 is shown in FIG. 1A and a side view of the structural enclosure 10 and the vehicle chassis 20 is shown in FIG. 1B. The structural enclosure 10 includes a battery box 100 with a plurality of battery compartments 102 configured to receive and hold a plurality of battery modules (not shown), and a pair of rails 120 (also referred to herein simply as "rails 120") extending along an outer surface 104 of the battery box 100. In some variations, the structural enclosure 10 is formed from or made out of an aluminum alloy (also referred to herein simply as "aluminum") and the pair of rails 120 are extruded aluminum rails. The vehicle chassis 20 includes a pair of rails 200 (also referred to herein simply as "rails 200"). In some variations, the vehicle chassis 20 is formed from or made out of steel. In at least one variation the battery box 100, the rails 120 and/or the rails 200 are E-coated. As used herein, the term "E-coat" or "E-coated" refers to a coating formed from an immersion wet paint finishing process that uses electrical current to attract paint product to a metal surface.

The structural enclosure 10 has a shape and size such that the rails 120 align with and can be securely mounted to the rails 200. Particularly, the battery box 100 and the rails 120 have a width (y direction) and a length (x direction) such that the rails 120 are generally parallel with and positioned at the same width as the rails 200. Also, the rails 120 are mounted to and spaced apart from the rails 200 via a plurality of sleeves 150 (also referred to herein simply as "sleeves 150"). The sleeves 150 each have a shaft 152, a head 156 with a predefined thickness TV, and an inner bore 158 extending longitudinally (z direction) through the shaft 152 and the head 156. In some variations, the shaft 152 has an outer knurled surface 154, i.e., at least a portion of an outer surface of the shaft 152 is a knurled surface 154. In some variations the sleeves 150 are formed from or made out of steel and/or are coated as described in greater detail below.

Figure 2:
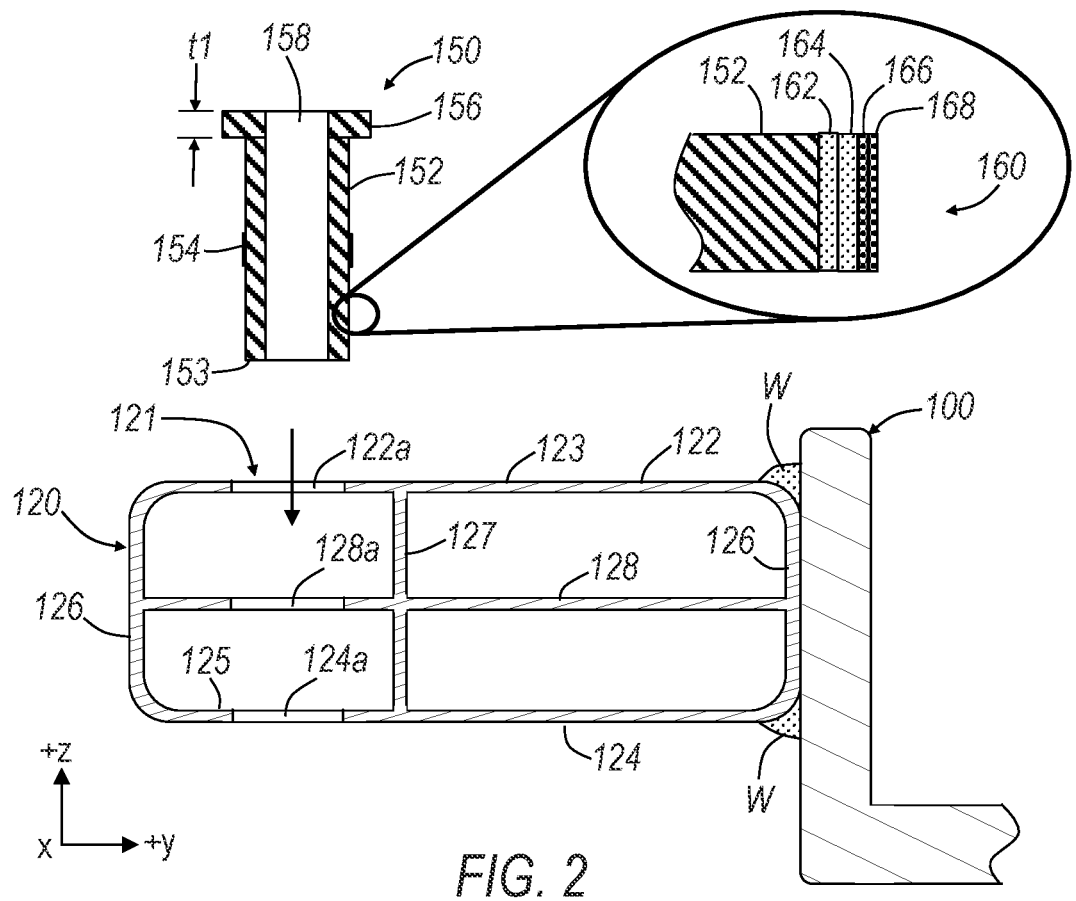
FIG. 2 shows a cross sectional view of section 2-2 in FIG. 1B showing a rail of the structural enclosure and a sleeve to be inserted or captured within the rail according to the teachings of the present disclosure.
Figure 3:
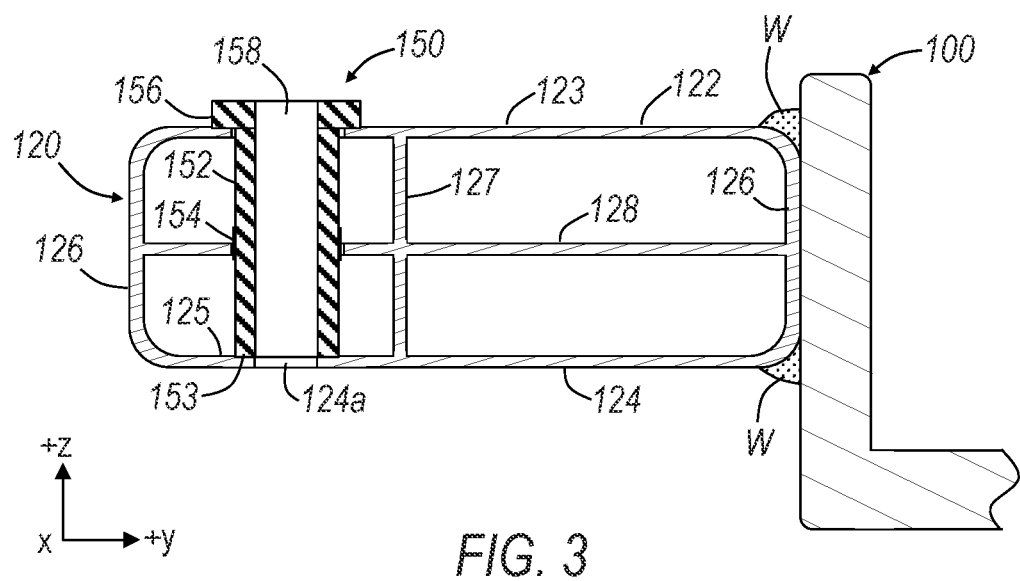
FIG. 3 shows the cross sectional view in FIG. 2 with the sleeve captured within the rail.

Referring to FIGS. 2 and 3, the rail 120 is rigidly attached to the battery box 100 with at least one weld 'W'. However, it should be understood that the rail 120 can be rigidly attached to the battery box 100 using other attachment techniques such as but not limited to mechanical fasteners, friction welding, and friction stir welding, among others. In addition, the rail 120 can be formed integrally with the battery box 100, e.g., a casting of the structural enclosure 10 with the battery box 100 and the structural rails 120.

FIGS. 2 and 3 also show a sleeve 150 being installed or captured within the rail 120. Particularly, the rail 120 has an aperture 121 dimensioned for the shaft 152 to be press fit within the rail 120. In some variations, the rail 120 includes an upper wall 122, a lower wall 124 and a pair of side walls 126 extending between the upper wall 122 and the lower wall 124. In such variations the upper wall 122 includes an aperture 122a, the lower wall 124 includes an aperture 124a, and at least the aperture 122a is dimensioned for the shaft 152 to slide and/or be press fit within the upper wall 122. In at least one variation the rail 120 includes a first cross member 127 extending between the upper wall 122 and the lower wall 124. And in some variations the rail includes a second cross member 128 extending between the pair of side walls 126. In such variations the second cross member 128 includes an aperture 128a. As shown in FIGS. 2 and 3, the apertures 122a, 124a, and 128a are aligned with each other along the z direction shown in the figures and the sleeve 150 and the apertures 122a, 124a, 128a are dimensioned such that the shaft 152 is inserted into and captured within the rail 120 with the head 156 disposed on an outer surface 123 of the rail 120. In some variations, the aperture 124a has an inner dimension (y direction) that provides for a distal end 153 of the shaft 152 to abut against an inner surface 125 of the rail 120. And in variations where the rail 120 includes the second cross member 128 with the aperture 128a, the aperture 128a can be dimensioned such that a press fit is defined between the outer knurled surface 154 and the second cross member 128.

In at least one variation, and as noted above, the sleeve 150 is coated as illustrated in the enlarged section of the sleeve 150 in FIG. 2. For example, the sleeve 150 can be coated with multiple layers of a multi-layer coating system 160 that electrochemically isolates the sleeve 150 from the rail 120 and the rail 200, and electrochemically isolates the rail 120 from the rail 200. In some variations, the multi-layer coating system 160 includes a first layer 162, a second layer 164, a third layer 166, and a fourth layer 168. In at least one variation, the first layer 162 is a first base coat layer (e.g., a 10-14 μm thick layer) applied and cured on the sleeve 150, the second layer 164 is a second basecoat layer (e.g., a 10-14 μm thick layer) applied and cured on the first layer 162, the third layer 166 is a first topcoat layer (e.g., a 3-7 μm thick layer) applied and cured on the second layer 164, and the fourth layer 168 is a second topcoat layer (e.g., a 3-7 μm thick layer) applied and cured on the third layer 166. And while FIG. 2 shows the multi-layer coating system 160 having four layers, it should be understood that coating systems with less than four layers and more than four layers are included within the scope of the present disclosure.

Figure 4:
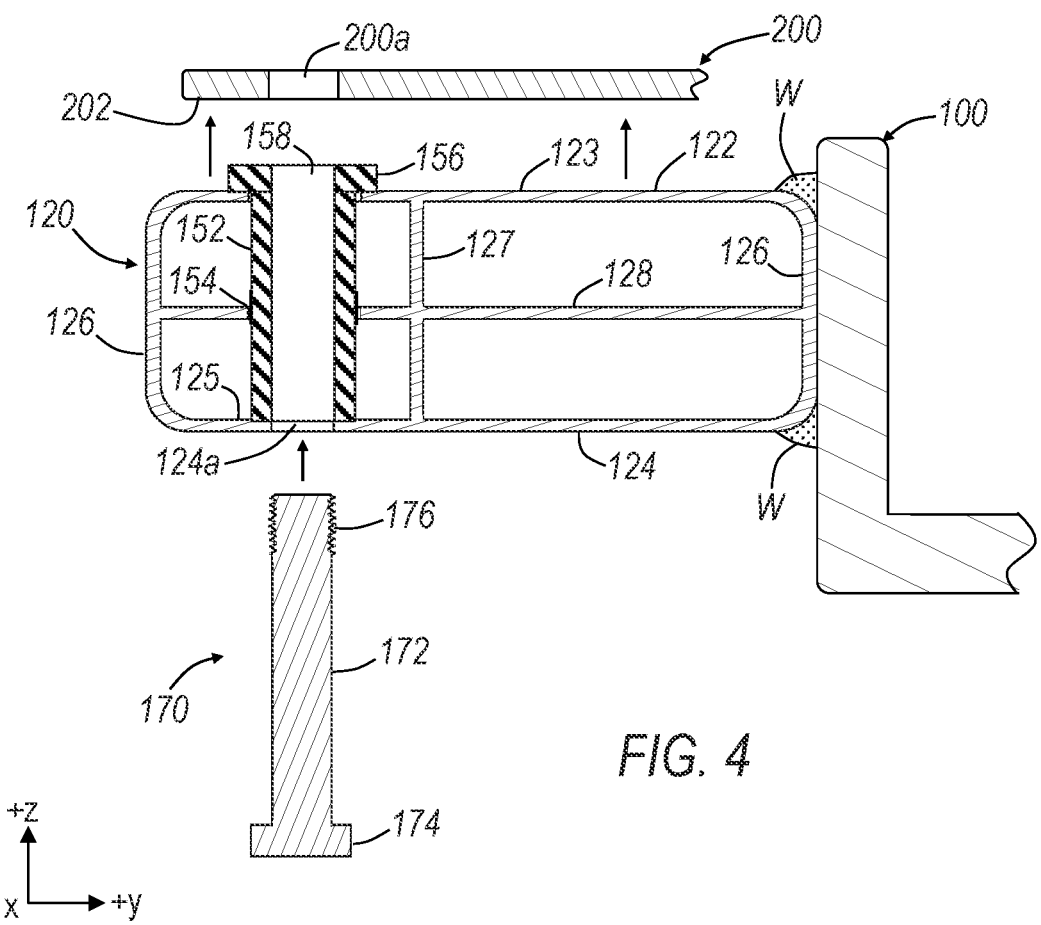
FIG. 4 shows the cross sectional view of FIG. 3 with a bolt to mount the rail of the structural enclosure to a rail of the vehicle chassis shown in FIG. 1A.
Figure 5:
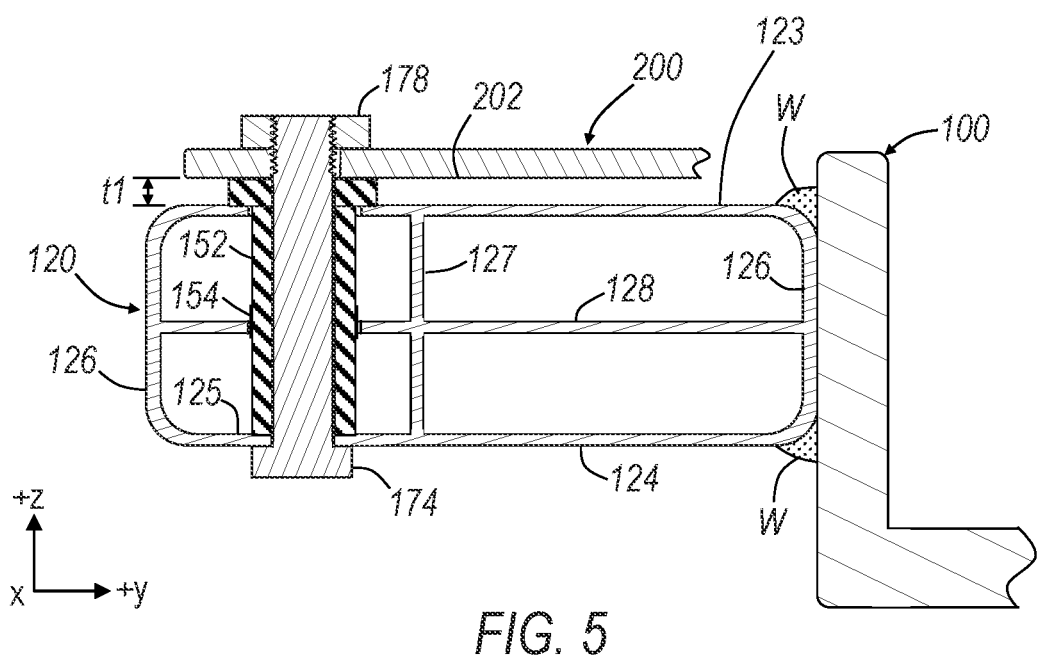
FIG. 5 shows the cross sectional view of FIG. 4 with the rail of the structural enclosure mounted to the rail of the vehicle chassis shown in FIG. 1A.

Referring to FIGS. 4 and 5, mounting of the rail 120 shown in FIG. 3 to the rail 200 is shown. Particularly, FIG. 4 shows the rail 120 disposed below (−z direction) the rail 200 and a bolt 170 disposed below the rail 120. The bolt 170 has a shaft 172 with a head 174 at one end of the shaft 172 and threads 176 (i.e., a threaded portion 176) at an opposite end of the shaft 172. And FIG. 5 shows the bolt 170 disposed within the sleeve 150 and an aperture 200a (FIG. 4) of the rail 200, and a nut 178 threadingly engaged with the threads 176 of the bolt 170 such that the rail 120, and thus the battery box 100, is rigidly mounted to the rail 200 and the vehicle chassis 20. It should be understood that in some variations the sleeve 150 is a "crush tube" for the rail 120. As used herein the phrase "crush tube" refers to a hollow sleeve or tube that provides additional support to a structure into which is it embedded or captured. It should also be understood that the nut 178 can be a weld nut, clinch nut, or pierce nut, among others. And while FIGS. 4 and 5 illustrate a bolt being used to mount the rail 120 to the rail 200, it should be understood that other attachment or mounting techniques used to mount the rail 120 to the rail 200 with the head 156 disposed therebetween are included within the scope of the present disclosure.

As shown in FIG. 5, the head 156 separates the outer surface 123 of the rail 120 from a lower surface 202 of the rail 200 by the thickness t1. In some variations the thickness t1 is between about 2.5 millimeters (mm) and about 10 mm, for example between about 3 mm and 7 mm, between about 4 mm and about 7 mm and/or between about 4.5 mm and about 5.5 mm. In one variation, the thickness t1 of the head 156 is about 5 mm.

In addition to the sleeves 150 separating the rail 120 from the rail 200 by a desired and predefined distance, the sleeves 150 provide for flexibility in design of the structural enclosure 10 and the vehicle chassis 20. For example, structural enclosures 10 with rails 120 formed from extruded aluminum alloys such as 6005, 6061, 6063 or 6082 can be mounted and electrochemically isolated from rails 200 formed from E-coated nongalvanized steel, E-coated galvanized steel, or E-coated Al—Si coated steel. Stated differently, design and manufacturing modifications may not be needed when battery boxes with rails made from different aluminum alloys and vehicle chassis rails made from different coated or uncoated steels are assembled together. In addition, flexibility in manufacturing is provided by the sleeves 150 being captured within the rails 120 (e.g., press fit) after the rails 120 are E-coated, or in the alternative, the sleeves 150 being captured within the rails 120 (e.g., press fit) before the rails are E-coated with the rails 120 and the installed sleeves 150 subsequently E-coated.

Figure 6:
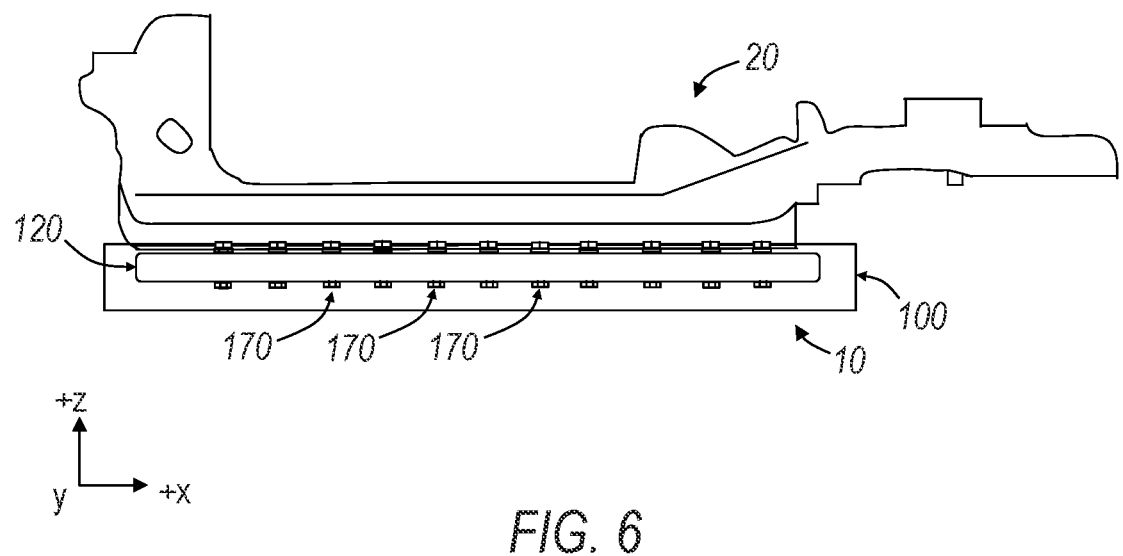
FIG. 6 is a side view of the structural enclosure mounted to the vehicle chassis in FIG. 1B.
Figure 7:
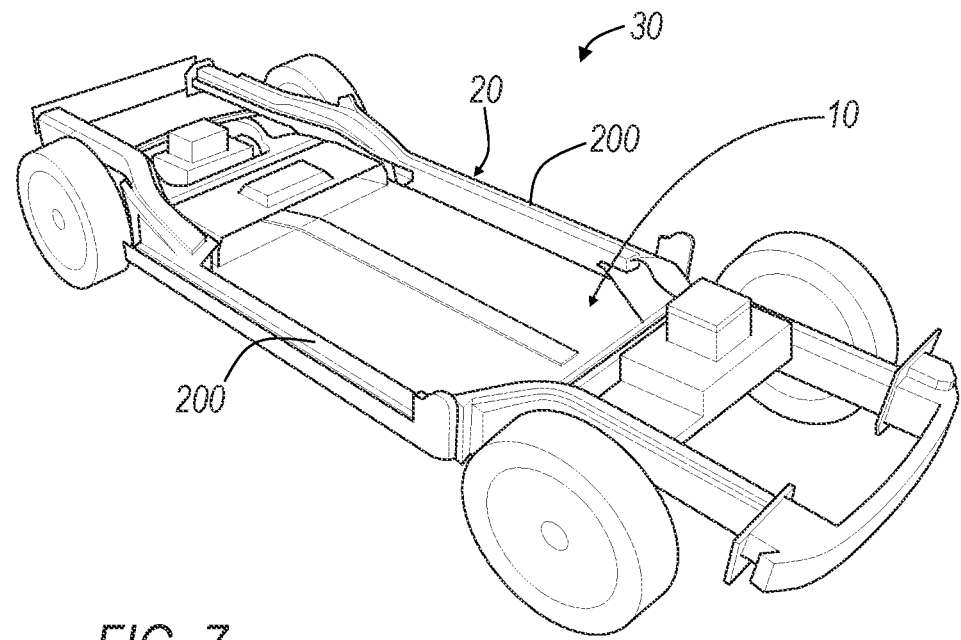
FIG. 7 is a perspective view of a structural enclosure mounted to a vehicle body-in-white according to the teachings of the present disclosure.

Referring to FIGS. 6 and 7, a side view of the structural enclosure 10 and the vehicle chassis 20 in FIG. 1B after the structural enclosure 10 is mounted to the vehicle chassis 20 is shown in FIG. 6 and a body-in-white assembly 30 with the structural enclosure 10 and the vehicle chassis 20 is shown in FIG. 7.

It should be understood that the sleeves 150 reduce or restrict contact between dissimilar metals. Particularly, contact area between the sleeve 150 and the rail 120, and between the sleeve 150 and the rail 200, that is exposed to the environment is reduced or limited to the area where the head 156 contacts the outer surface 123 of the rail 120 and where the head 156 contacts the outer surface 202 of the rail 200. And both areas are under compression via the bolt 170 threadingly engaged with the nut 178. Accordingly, using the plurality of sleeves 150 to mount the rail 120 to the rail 200 inhibits water intrusion between the head 156 and the outer surface 123 of the rail 120 and between the head 156 and the lower surface 202 of the rail 200. As such, the sleeves 150 enhance corrosion mitigation between the dissimilar materials of the rail 120 and the rail 200. In addition, the thickness t1 of the head 156 provides a desirable distance or space between the rail 120 and the rail 200 such that the collection or 'bridging" of liquid (e.g., water) and/or debris between the rail 120 and the rail 200 is inhibited, thereby reducing the chance of the rail 120 coming into electrochemical contact with the rail 200.

Figure 8:
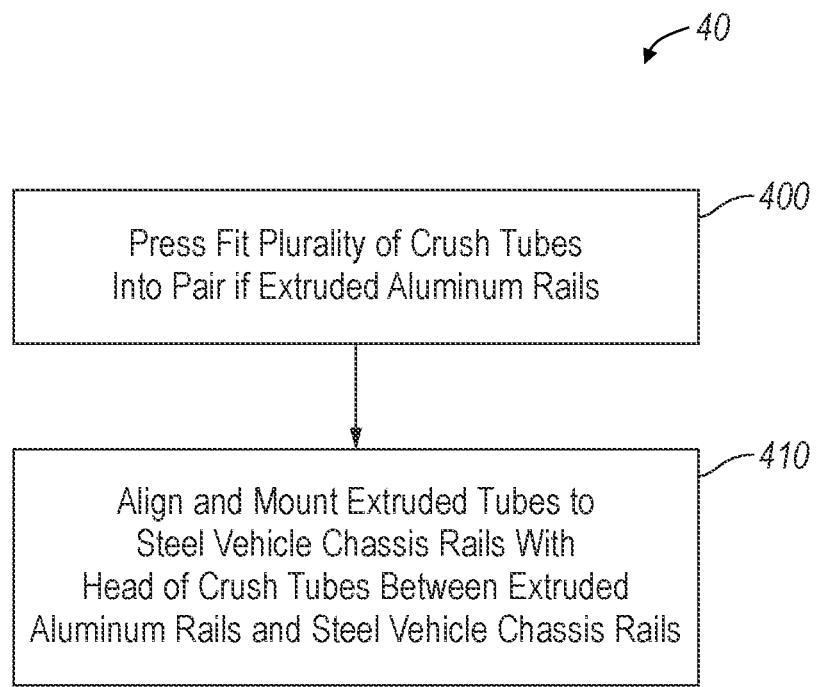
FIG. 8 is a flow chart for a method of mounting an aluminum structural enclosure to a steel vehicle chassis according to the teachings of the present disclosure.

Referring to FIG. 8, a flow chart for a method 40 of mounting an aluminum structural enclosure to a steel vehicle chassis is shown. The method 40 includes press fitting a plurality of crush tubes into a pair of extruded aluminum rails at 400 as shown and described above with respect to FIGS. 2 and 3. And the pair of extruded aluminum rails with the installed or captured crush tubes are aligned with and bolted to a steel vehicle chassis at 410 as shown and described in FIGS. 4 and 5. Accordingly, an assembly of the aluminum structural enclosure and the steel vehicle chassis is provided as shown and described in FIG. 6. As noted above, in some variations each of the crush tubes are coated with a multi-layer coating system, the aluminum extruded rails are E-coated and/or the steel vehicle chassis is E-coated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural enclosure comprising:
    at least one aluminum rail comprising an upper wall and a lower wall spaced apart from the upper wall; and
    at least one sleeve extending into and captured within the at least one aluminum rail, the at least one sleeve comprising a head with a predefined thickness,
    wherein the head of the sleeve is disposed on an outer surface of the aluminum rail and is configured to separate the outer surface of the aluminum rail from a steel body structure to which the aluminum rail is mounted.

2. The structural enclosure according to claim 1, further comprising a plurality of sleeves extending into the aluminum rail and each of the plurality of sleeves comprise the head with the predefined thickness disposed on the outer surface of the aluminum rail and configured to separate the outer surface of the aluminum rail from a steel body structure to which the aluminum rail is mounted.

3. The structural enclosure according to claim 2, wherein each of the plurality of sleeves comprise a shaft extending from the head and the shaft of each of the plurality of sleeves is disposed in the at least one aluminum rail.

4. The structural enclosure according to claim 3, wherein the shaft of each of the plurality of sleeves is a hollow shaft.

5. The structural enclosure according to claim 4 further comprising a plurality of bolts, wherein a respective bolt of the plurality of bolts extends at least partially through the hollow shaft of each of the plurality of sleeves.

6. The structural enclosure according to claim 5, wherein the plurality of bolts extending at least partially through the hollow shaft of each of the plurality of sleeves is configured to mount the at least one aluminum rail to the steel body structure.

7. The structural enclosure according to claim 1, wherein the at least one aluminum rail is securely coupled to a battery box configured to enclose a battery for an electric vehicle.

8. The structural enclosure according to claim 7, wherein the at least one aluminum rail is two aluminum rails securely coupled to the battery box configured to enclose the battery for an electric vehicle.

9. The structural enclosure according to claim 1, wherein the at least one aluminum rail comprises a pair of side walls extending between the upper wall and the lower wall.

10. The structural enclosure according to claim 9, wherein the at least one sleeve extends through the upper wall and the head is disposed on the outer surface of the upper wall.

11. The structural enclosure according to claim 10, wherein the at least one aluminum rail further comprises a cross member extending between the pair of side walls and spaced apart from the upper wall and the lower wall, and the at least one sleeve extends through the upper wall and the cross member.

12. The structural enclosure according to claim 11, wherein the at least one sleeve comprises a shaft with an outer knurled surface engaged with the cross member.

13. The structural enclosure according to claim 1, wherein at least one of the at least one aluminum rail and the at least one sleeve comprise a coating such that the at least one aluminum rail is electrochemically isolated from the at least one sleeve.

14. The structural enclosure according to claim 1, wherein the at least one aluminum rail and the at least one sleeve each comprise a E-coating such that the at least one aluminum rail is electrochemically isolated from the at least one sleeve.

15. A structural enclosure comprising:
a battery box configured to enclose a battery for an electric vehicle;
at least one aluminum rail comprising an upper wall, a lower wall spaced apart from the upper wall, the at least one aluminum rail being securely mounted to the battery box; and
a plurality of sleeves extending into and captured within the at least one aluminum rail, wherein each of the plurality of sleeves comprise a head with a predefined thickness disposed on an outer surface of the aluminum rail and configured to separate the outer surface of the at least one aluminum rail from a steel body structure to which the at least one aluminum rail is mounted.

16. The structural enclosure according to claim 15, wherein the at least one aluminum rail comprises a pair of side walls extending between the upper wall and the lower wall, a cross member extending between the pair of side walls and spaced apart from the upper wall and the lower wall, and each of the plurality of sleeves extends through the upper wall and the cross member with the head disposed on the outer surface of the upper wall.

17. The structural enclosure according to claim 16, wherein the at least one aluminum rail comprises an E-coating and each of the plurality of sleeves comprises a multilayer coating such that the at least one aluminum rail is electrochemically isolated from the plurality of sleeves.

18. A structural enclosure comprising:
an aluminum battery box configured to enclose a battery for an electric vehicle;
a pair of E-coated aluminum rails comprising an upper wall, a lower wall spaced apart from the upper wall, the pair of E-coated aluminum rails being securely mounted to the aluminum battery box; and
a plurality of E-coated sleeves extending into and captured within the pair of E-coated aluminum rails, wherein each of the plurality of E-coated sleeves comprise a head with a predefined thickness disposed on an outer surface of each of the pair of E-coated aluminum rails such that the outer surface of the pair of E-coated aluminum rails is spaced apart from an E-coated steel body structure to which the pair of E-coated aluminum rails are mounted.

19. The structural enclosure according to claim 18 further comprising a plurality of bolts extending at least partially through the plurality of E-coated sleeves and mounting the pair of E-coated aluminum rails to the E-coated steel body structure.

20. The structural enclosure according to claim 1, further comprising a battery box configured to enclose a battery for an electric vehicle, the at least one aluminum rail being securely mounted to the battery box.

\* \* \* \* \*